(12) United States Patent
Dong

(10) Patent No.: US 12,224,864 B2
(45) Date of Patent: Feb. 11, 2025

(54) DATA TRANSMISSION METHOD AND APPARATUS, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 17/582,491

(22) Filed: Jan. 24, 2022

(65) Prior Publication Data
US 2022/0149993 A1    May 12, 2022

Related U.S. Application Data

(63) Continuation of application No. PCT/CN2019/097795, filed on Jul. 25, 2019.

(51) Int. Cl.
*H04L 1/1607* (2023.01)
*H04L 1/1812* (2023.01)

(52) U.S. Cl.
CPC .......... *H04L 1/1614* (2013.01); *H04L 1/1812* (2013.01)

(58) Field of Classification Search
CPC ... H04L 1/1614; H04L 1/1887; H04L 1/1819; H04L 1/1812; H04L 1/1864
See application file for complete search history.

(56) References Cited

U.S. PATENT DOCUMENTS

| | | | |
|---|---|---|---|
| 9,608,789 B2 | 3/2017 | Wang et al. | |
| 2010/0169503 A1* | 7/2010 | Kollmansberger | ... H04L 67/561 709/231 |
| 2012/0099588 A1* | 4/2012 | Liu | ..... H04N 21/2381 370/389 |
| 2012/0327838 A1 | 12/2012 | Ho | |
| 2013/0301569 A1 | 11/2013 | Wang et al. | |
| 2017/0126363 A1 | 5/2017 | Wang et al. | |
| 2017/0155490 A1 | 6/2017 | Wang et al. | |
| 2018/0241531 A1 | 8/2018 | Wang et al. | |
| 2019/0058511 A1 | 2/2019 | Bolotin et al. | |
| 2020/0204372 A1* | 6/2020 | Ngo | ..... H04L 9/3297 |
| 2021/0211509 A1* | 7/2021 | Ly | ..... H04L 41/22 |
| 2021/0211589 A1* | 7/2021 | Cook | ..... H01Q 15/08 |

(Continued)

FOREIGN PATENT DOCUMENTS

| | | |
|---|---|---|
| CN | 1954553 A | 4/2007 |
| CN | 104321995 A | 1/2015 |
| CN | 106464434 A | 2/2017 |

(Continued)

OTHER PUBLICATIONS

State Intellectual Property Office of the People's Republic of China, Office Action and Search Report Issued in Application No. 201980001557.8, Sep. 15, 2022, 12 pages.

(Continued)

*Primary Examiner* — Chi Ho A Lee (74) *Attorney, Agent, or Firm* — Volpe Koenig (57) ABSTRACT

One or more embodiments of the present disclosure relate to data transmission methods and apparatuses and storage media. The method includes generating a data frame, wherein the data frame includes a payload format identifier bit for indicating a payload format of the data frame; and transmitting the data frame.

20 Claims, 4 Drawing Sheets

(56) References Cited

U.S. PATENT DOCUMENTS

2021/0307045 A1* 9/2021 Ma .................. H04W 72/0453

FOREIGN PATENT DOCUMENTS

| CN | 106899390 A | 6/2017 |
| EP | 1751921 A | 2/2007 |

OTHER PUBLICATIONS

ISA State Intellectual Property Office of the People's Republic of China, Written Opinion of the International Searching Authority Issued in Application No. PCT/CN2019/097795, Apr. 20, 2020, WIPO, 7 pages.

ISA State Intellectual Property Office of the People's Republic of China, International Search Report Issued in Application No. PCT/CN2019/097795, Apr. 20, 2020, WIPO, 4 pages.

* cited by examiner

DATA TRANSMISSION METHOD AND APPARATUS, AND STORAGE MEDIUM

CROSS-REFERENCE TO RELATED APPLICATION

The present application is a continuation of International Application No. PCT/CN2019/097795, filed on Jul. 25, 2019, all of which is incorporated herein by reference in its entirety.

TECHNICAL FIELD

The present application relates to the field of wireless communication technologies, but is not limited to the field of wireless communication technologies, and in particular relates to data transmission methods, apparatuses and storage media.

BACKGROUND

In wireless communications, Acknowledge character (ACK) or Block ACK mechanism is adopted for indicating whether a data frame is correctly received. Specifically, whether the data frame is correctly received is indicated by a bit. If the data frame is not correctly received, data will be retransmitted by use of an Automatic Repeat-Request (ARQ) mechanism.

SUMMARY

In this context, one or more embodiments of the present disclosure provide data transmission methods, apparatuses and storage media.

According to a first aspect of embodiments of the present disclosure, there is provided a data transmission method. The method includes: generating a data frame, where the data frame includes a payload format identifier bit for indicating a payload format of the data frame; and transmitting the data frame.

In an embodiment, the data frame further includes a retransmission identifier bit indicating, when the retransmission identifier bit is of a first preset value, that the data frame is a retransmission data frame, wherein a payload format of the retransmission data frame is different from that of an initial transmission data frame corresponding to the retransmission data frame; and indicating, when the retransmission identifier bit is of a second preset value, that the data frame is an initial transmission data frame.

In an embodiment, when the data frame is a continuous data frame, the data frame further includes a Continuous Data Frame Serial Number (CDFSN) of the data frame; and when the data frame is an aggregation data frame, the data frame further includes an Aggregation Data Sub-Frame Transmitting Serial Number (ADSFTSN), wherein the ADSFTSN corresponds to a transmitting sequence of an aggregation data sub-frame in the data frame.

In an embodiment, a retransmission sub-frame of the retransmission data frame includes either a CDFSN of an initial transmission data frame corresponding to the retransmission sub-frame, or an ADSFTSN of an initial transmission sub-frame corresponding to the retransmission sub-frame.

In an embodiment, the data frame further includes a bitmap information identifier bit, wherein the bitmap information identifier bit is used to indicate position information of at least one initial transmission sub-frame corresponding to at least one retransmission sub-frame included in the retransmission data frame.

In an embodiment, the method further includes: locating, when the retransmission data frame includes a retransmission sub-frame and an initial transmission sub-frame at the same time, the retransmission sub-frame before the initial transmission sub-frame.

In an embodiment, at least one of the payload format identifier bit, the retransmission identifier bit or the bitmap information identifier bit is disposed within a physical layer (PHY) header of the data frame.

In an embodiment, at least one of the payload format identifier bit, the retransmission identifier bit and the bitmap information identifier bit is located within a domain for Hybrid Automatic Repeat reQuest (HARD) control of the PHY header in the data frame.

In an embodiment, the retransmission data frame further includes a frequency band information bit indicating a frequency band of the initial transmission data frame and the frequency band information bit indicates whether a transmitting frequency band of the initial transmission data frame is identical to or different from a transmitting frequency band of the retransmission data frame.

In an embodiment, the method further includes configuring the payload format of the data frame according to an identifier bit for identifying a format of a payload in the data frame.

According to a second aspect of embodiments of the present disclosure, there is provided a data transmission method. The method includes: receiving a data frame, wherein the data frame includes a payload format identifier bit for indicating a payload format of the data frame; and determining the payload format of the data frame according to the payload format identifier bit.

In an embodiment, the data frame further includes a retransmission identifier bit; the method further includes: identifying, when the retransmission identifier bit is of a first preset value, that the data frame is a retransmission data frame, wherein a payload format of the retransmission data frame is different from that of an initial transmission data frame corresponding to the retransmission data frame; and identifying, when the retransmission identifier bit is of a second preset value, that the data frame is an initial transmission data frame.

In an embodiment, when the data frame is a continuous data frame, the data frame further includes a CDFSN of the data frame; and when the data frame is an aggregation data frame the data frame further includes an ADSFTSN, wherein the ADSFTSN corresponds to a transmitting sequence of an aggregation data sub-frame in the data frame; and wherein the method further includes: returning, when receiving the data frame is failed, the CDFSN or the ADSFTSN to a transmitter.

In an embodiment, a retransmission sub-frame of the retransmission data frame includes either a CDFSN of an initial transmission data frame corresponding to the retransmission sub-frame or an ADSFTSN of an initial transmission sub-frame corresponding to the retransmission sub-frame; and the method further includes: determining the initial transmission data frame corresponding to the retransmission sub-frame according to the CDFSN or determining the initial transmission sub-frame corresponding to the retransmission sub-frame according to the ADSFTSN.

In an embodiment, the data frame further includes a bitmap information identifier bit, wherein the bitmap information identifier bit is used to indicate position information of at least one initial transmission sub-frame corresponding to at least one retransmission sub-frame included in the retransmission data frame; and the method further includes: determining the at least one initial transmission sub-frame corresponding to the at least one retransmission sub-frame according to the bitmap information identifier bit.

In an embodiment, the retransmission data frame further includes a frequency band information bit of the initial transmission data frame; the frequency band information bit indicates whether a transmitting frequency band of the initial transmission data frame is identical to or different from a transmitting frequency band of the retransmission data frame; and the method further includes: determining at least one other initial transmission data frame received at the transmitting frequency band of the initial transmission data frame according to the frequency band information bit.

According to a third aspect of embodiments of the present disclosure, there is provided a data transmission apparatus. The apparatus includes a generating module, and a first transmitting module. The generating module is configured to generate a data frame, wherein the data frame includes a payload format identifier bit for indicating a payload format of the data frame. The first transmitting module is configured to transmit the data frame.

In an embodiment, the data frame further includes a retransmission identifier bit indicating, when the retransmission identifier bit is of a first preset value, that the data frame is a retransmission data frame, wherein a payload format of the retransmission data frame is different from that of an initial transmission data frame corresponding to the retransmission data frame; and indicating, when the retransmission identifier bit is of a second preset value, that the data frame is an initial transmission data frame.

In an embodiment, when the data frame is a continuous data frame, the data frame further includes a CDFSN of the data frame; and when the data frame is an aggregation data frame, the data frame further includes an ADSFTSN, wherein the ADSFTSN corresponds to a transmitting sequence of an aggregation data sub-frame in the data frame.

In an embodiment, a retransmission sub-frame of the retransmission data frame includes either a CDFSN of an initial transmission data frame corresponding to the retransmission sub-frame or an ADSFTSN of an initial transmission sub-frame corresponding to the retransmission sub-frame.

In an embodiment, the data frame further includes a bitmap information identifier bit, wherein the bitmap information identifier bit is used to indicate position information of at least one initial transmission sub-frame corresponding to at least one retransmission sub-frame included in the retransmission data frame.

In an embodiment, the generating module further includes: a generating sub-module configured to locate, when the retransmission data frame includes a retransmission sub-frame and an initial transmission sub-frame at the same time, the retransmission sub-frame before the initial transmission sub-frame.

In an embodiment, at least one of the payload format identifier bit, the retransmission identifier bit and the bitmap information identifier bit is disposed within a PHY header of the data frame.

In an embodiment, at least one of the payload format identifier bit, the retransmission identifier bit and the bitmap information identifier bit is disposed within a domain for Hybrid Automatic Repeat reQuest (HARD) control in the PHY header of the data frame.

In an embodiment, the retransmission data frame further includes a frequency band information bit indicating a frequency band of the initial transmission data frame; the frequency band information bit indicates whether a transmitting frequency band of the initial transmission data frame is identical to or different from a transmitting frequency band of the retransmission data frame.

In an embodiment, the apparatus further includes: a first determining module configured to determine the payload format of the data frame according to a correspondence between the payload format of the data frame and an identifier bit for identifying a format of a payload in the data frame.

According to a fourth aspect of embodiments of the present disclosure, there is provided a data transmission apparatus. The apparatus includes a receiving module and a second determining module. The receiving module is configured to receive a data frame, wherein the data frame includes a payload format identifier bit for indicating a payload format of the data frame. The second determining module is configured to determine the payload format of the data frame according to the payload format identifier bit.

In an embodiment, the data frame further includes a retransmission identifier bit indicating, when the retransmission identifier bit is of a first preset value, that the data frame is a retransmission data frame, wherein a payload format of the retransmission data frame is different from that of an initial transmission data frame corresponding to the retransmission data frame; and indicating, when the retransmission identifier bit is of a second preset value, that the data frame is an initial transmission data frame.

In an embodiment, when the data frame is a continuous data frame, the data frame further includes a CDFSN of the data frame; and when the data frame is an aggregation data frame, the data frame further includes an ADSFTSN, wherein the ADSFTSN corresponds to a transmitting sequence of an aggregation data sub-frame in the data frame. The apparatus further includes: a second transmitting module configured to return, when receiving the data frame has failed, the CDFSN or the ADSFTSN to a transmitter.

In an embodiment, a retransmission sub-frame of the retransmission data frame includes either a CDFSN of an initial transmission data frame corresponding to the retransmission sub-frame or an ADSFTSN of an initial transmission sub-frame corresponding to the retransmission sub-frame. The apparatus further includes: a third determining module configured to determine the initial transmission data frame corresponding to the retransmission sub-frame according to the CDFSN or to determine the initial transmission sub-frame corresponding to the retransmission sub-frame according to the ADSFTSN.

In an embodiment, the data frame further includes a bitmap information identifier bit, wherein the bitmap information identifier bit is used to indicate position information of at least one initial transmission sub-frame corresponding to at least one retransmission sub-frame included in the retransmission data frame. The apparatus further includes: a fourth determining module configured to determine the at least one initial transmission sub-frame corresponding to the at least one retransmission sub-frame according to the bitmap information identifier bit.

In an embodiment, the retransmission data frame further includes a frequency band information bit indicating a frequency band of the initial transmission data frame; the frequency band information bit indicates whether a transmitting frequency band of the initial transmission data frame is identical to or different from a transmitting frequency band of the retransmission data frame. The apparatus further includes: a fifth determining module configured to determine at least one other initial transmission data frame received at the transmitting frequency band of the initial transmission data frame based on the frequency band information bit.

According to a fifth aspect of embodiments of the present disclosure, there is provided a data transmission apparatus. The apparatus includes a processor, a memory and executable programs stored in the memory and run on the processor, where the processor runs the executable programs to implement steps of the data transmission method according to the first or second aspect.

According to a sixth aspect of embodiments of the present disclosure there is provided a storage medium, which may comprise a non-transitory computer readable storage medium storing executable programs thereon. The executable programs are executed by a processor to implement steps of the data transmission method according to the first or second aspect.

In the data transmission methods, apparatuses and storage media provided by the embodiments of the present disclosure, a data frame is generated, wherein the data frame includes a payload format identifier bit for indicating a payload format of the data frame; and the data frame is transmitted. In this case, an explicit payload format indication may be provided and a receiver may decode a payload of the data frame according to the payload format indicated by the payload format identifier bit. Thus, the receiver can identify payloads of different formats at a higher efficiency, thus improving the data transmission efficiency.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Exemplary embodiments will be described in detail herein, with the illustrations thereof represented in the drawings. When the following descriptions refer to the drawings, like numerals in different drawings refer to like or similar elements unless otherwise indicated. The examples described in the following exemplary embodiments do not represent all examples consistent with embodiments of the present disclosure. Rather, they are merely examples of apparatuses and methods consistent with some aspects of the present disclosure as detailed in the appended claims.

The terms used in the embodiments of the present disclosure are for the purpose of describing particular embodiments only, and are not intended to limit the embodiments of the present disclosure. Terms determined by "a", "the" and "said" in their singular forms in the embodiments of the present disclosure and the appended claims are also intended to include plurality, unless clearly indicated otherwise in the context. It should also be understood that the term "and/or" as used herein refers to and includes any and all possible combinations of one or more of the associated listed items.

It should be understood that, although the terms "first," "second," "third," and the like may be used in the embodiments of the present disclosure to describe various information, such information should not be limited to these terms. These terms are only used to distinguish one category of information from another. For example, without departing from the scope of the embodiments of the present disclosure, first information may be referred as second information; and similarly, the second information may also be referred as the first information. Depending on the context, the term "if" as used herein may be interpreted as "when" or "upon" or "in response to determining".

An execution entity involved in the embodiments of the present disclosure includes but is not limited to: a network device in a wireless communication network, especially, a network device in a Wi-Fi network, for example, operating in accordance with an IEEE802.11a/b/g/n/ac standard, and a network device operating in accordance with the 802.11be standard in a next generation Wi-Fi network. The network device includes but is not limited to: a wireless access point device such as a Wi-Fi router, a user terminal, a user node, a mobile terminal or a tablet computer or the like.

In an application scenario of the embodiments of the present disclosure, when a wireless communication transmitter network transmits a Physical Layer Protocol Data Unit (PPDU) to a receiver network, the physical layer protocol data is not always successfully received by a peer device due to various influences of communication environment, for example, a poor communication environment itself or a communication conflict in the environment or the like, and thus retransmission is sometimes needed. In related arts, retransmission may be repeated a number of times to increase the chance of successful reception, which can result in a reception error of retransmission data and initial transmission data. When transmission is repeated this way, it can result in low spectral efficiency, and can lower the throughput of the entire network.

Figure 1:
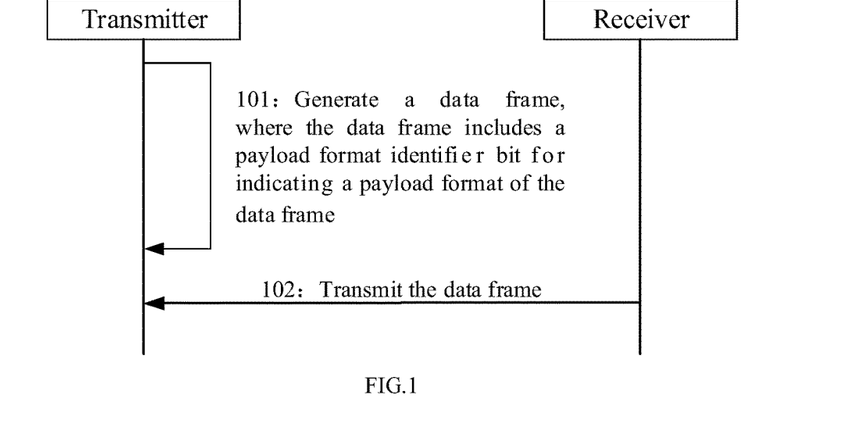
FIG. 1 is a flowchart illustrating a data transmission method according to an embodiment of the present disclosure.

As shown in FIG. 1, an exemplary embodiment of the present disclosure provides a data transmission method which may be applied to a transmitter in a wireless communication network. The method includes the following steps. At step 101, a data frame is generated, where the data frame includes a payload format identifier bit to indicate a payload format of the data frame. At step 102, the data frame is transmitted.

Herein, the data frame may be a physical layer protocol data frame. The data frame may be a unicast data frame or a continuous data frame. The data frame may be applied to data transmission conforming to a Hybrid Automatic Repeat reQuest (HARQ) process. A wireless Access Point (AP) or a wireless STAtion (STA) or the like may serve as a transmitter to transmit the data frame. A receiver such as a terminal may receive the data frame. The data frame is transmitted and received between the transmitter and the receiver based on Wi-Fi protocol.

Figure 2:
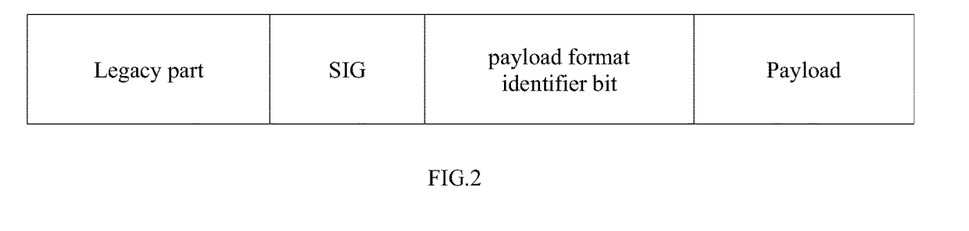
FIG. 2 is a schematic diagram illustrating a data frame format according to an embodiment of the present disclosure.

As shown in FIG. 2, the data frame may include a Legacy part, a SIGnal (SIG) part and a Payload part. The legacy part may include a Physical Layer Convergence Protocol (PLCP) Preamble and the like (not shown). The SIG part is used to define a data transmission rate and the Payload part may include a Media access control Protocol Data Unit (MPDU) and the like. The data frame may include a part for conveying a payload format identifier bit to identify a payload format of the data frame. For example, the payload format identifier bit may comprise three bits that occupy three bit positions to identify one of eight possible different payload formats.

By identifying the particular payload format of the data frame with the payload format identifier bit, the payload format is explicitly indicated to the receiver. The receiver may decode a payload of the data frame according to the payload format explicitly indicated by the payload format identifier bit. The ability conferred by the payload format identifier bit upon the receiver (to decode the payload) improves an efficiency of the receiver when identifying different formats of payloads, and this further improves data transmission efficiency.

In an embodiment, the data frame further includes a retransmission identifier bit. When the retransmission identifier bit is of a first preset value, the data frame is indicated as a retransmission data frame, wherein a payload format of the retransmission data frame is different from a payload format of an initial transmission data frame corresponding to the retransmission data frame; and when the retransmission identifier bit is of a second preset value, the data frame is indicated as an initial transmission data frame.

The retransmission identifier bit may occupy one bit position. Therefore, the data frame may be indicated as the retransmission data frame and the initial transmission data frame by using two different bit values respectively. For example, the data frame is indicated as the retransmission data frame by setting the retransmission identifier bit to "1" and the data frame is indicated as the initial transmission data frame by setting the retransmission identifier bit to "0".

The retransmission identifier bit may also comprise a plurality of bits occupying a plurality of bit positions, for example, occupying two bit positions. When occupying two bit positions, the retransmission identifier bit can represent four different values, i.e. "00", "01", "10" and "11". By comprising a plurality of format bits, the retransmission identifier bit can be used to indicate a data frame as the retransmission data frame or the initial transmission data frame, and to indicate different positions for a pilot symbol, or to provide incremental redundancy (IR), thus increasing a decoding success rate.

Herein, a payload of the retransmission data frame may entirely comprise retransmitted data, for example, the payload may merely include retransmitted MPDU; or may partially include initially-transmitted data, for example, the payload includes the retransmitted MPDU and the initially-transmitted MPDU.

If a payload of the initial transmission data frame and the payload of the retransmission data frame adopt the same format, a reception failure of the payload may easily occur. In this case, a success rate of combination analysis on the payload of the initial transmission data frame and the payload of the retransmission data frame is reduced. Thus, as disclosed herein, the payload of the retransmission data frame and the payload of the initial transmission data frame corresponding to the retransmission data frame may adopt different formats. By adopting different formats for the payload of the retransmission data frame and the payload of the initial transmission data frame corresponding to the retransmission data frame, the reception failure of the payload can be reduced. During combination analysis, data in the payload of the initial transmission data frame and the payload of the retransmission data frame may be supplemented mutually by using successfully-received data, thus improving the success rate of the combination analysis.

The initial transmission data frame and the retransmission data frame may also adopt different Modulation and Coding Schemes (MCS) and an indication bit may be disposed in the frame for indicating a MCS applied to the data frame. The MCS defines a modulation and coding scheme applied to the physical layer protocol data frame, and different MCSs correspond to different physical layer protocol data frame transmission rates. Different MCSs have different adaptabilities to a communication environment. Generally, an MCS with a relative low rate places a relatively low demand on the communication environment. Thus, for example, an initial transmission data frame can adopt a manner of MCS7 and a manner of MCS5 can be adopted during retransmission, thereby lowering the demand on the communication environment. Of course, the initial transmission data frame and the retransmission data frame may adopt a same MCS manner.

In an embodiment, when the data frame is a continuous data frame, the data frame further includes a Continuous Data Frame Serial Number (CDFSN) of the data frame; and when the data frame is an aggregation data frame, the data frame further includes an Aggregation Data Sub-Frame Transmitting Serial Number (ADSFTSN), wherein the ADSFTSN corresponds to a transmitting sequence of an aggregation data sub-frame in the data frame. The aggregation data sub-frame refers to a sub-frame in the aggregation data frame. The CDFSN is a serial number of the data frame in continuous data frames. All ADSFTSNs in the data frame are in one-to-one correspondence with respective transmitting sequences of aggregation data sub-frames in the data frame. After receiving the data frame, the receiver may transmit feedback information for reception using ACK/NACK according to the CDFSN or the ADSFTSN. In the feedback information, the CDFSN or the ADSFTSN of the data frame may be fed back in the form of bitmap.

In an embodiment, a retransmission sub-frame of the retransmission data frame includes a CDFSN of an initial transmission data frame corresponding to the retransmission sub-frame, or an ADSFTSN of an initial transmission sub-frame corresponding to the retransmission sub-frame. Herein, the retransmission data frame may be an aggregation data frame, and the retransmission sub-frame may be may be a sub-frame of the aggregation data frame, and may also be referred to as an aggregation data sub-frame. The content of the retransmission sub-frame may be an initial transmission data frame or an initial transmission sub-frame of the aggregation data frame.

Figure 3:
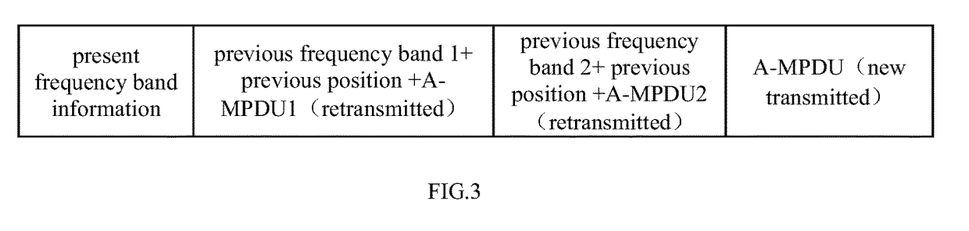
FIG. 3 is a schematic diagram illustrating another data frame format according to an embodiment of the present disclosure.

In the data frame shown in FIG. 3, a retransmitted A-MPDU represents a retransmitted aggregation data sub-frame, and a previous position represents a CDFSN of an initial transmission data frame corresponding to the retransmission sub-frame or an ADSFTSN of an initial transmission sub-frame corresponding to the retransmission sub-frame. In FIG. 3, each retransmission sub-frame carries a previous position. After receiving the data frame, the receiver performs combination analysis on each retransmission sub-frame as well as the initial transmission data frame or the retransmission sub-frame corresponding to the previous position.

When the content of the retransmission sub-frame includes content of an initial transmission data frame, the retransmission sub-frame may include a serial number of the initial transmission data frame in continuous data frames. In this way, when the receiver performs combination analysis, the receiver may determine the initial transmission data frame corresponding to the retransmission sub-frame based on the serial number.

When the content of the retransmission sub-frame includes content of a sub-frame of an initial transmission aggregation data frame, the retransmission sub-frame may include an ADSFTSN of the sub-frame in the aggregation data frame. When performing combination analysis, the receiver may determine an initial transmission sub-frame in the aggregation data frame corresponding to the retransmission sub-frame based on the ADSFTSN. Herein, the CDFSN or the ADSFTSN may also be in the form of bitmap.

In an embodiment, the data frame further includes a bitmap information identifier bit, wherein the bitmap information identifier bit is used to indicate position information of at least one initial transmission sub-frame corresponding to at least one retransmission sub-frame included in the retransmission data frame.

Herein, the data frame is a retransmission data frame, the retransmission data frame may include at least one retransmission sub-frame, and the position information of an initial transmission sub-frame corresponding to the retransmission sub-frame may be represented in the form of bitmap in the bitmap information identifier bit of the retransmission data frame. After receiving the retransmission data frame, the receiver may determine an initial transmission sub-frame corresponding to the retransmission sub-frame based on the bitmap information identifier bit, and perform combination analysis based on the determined retransmission sub-frame and initial transmission sub-frame.

For example, an initial transmission data frame includes four sub-frames. After receiving initial transmission data, the receiver may feed back reception information in the form of a bitmap, for example, indicating, with "1100", that a third sub-frame and a fourth sub-frame in the initial transmission data frame are not correctly received. When transmitting the retransmission data frame, the bitmap information identifier bit of the retransmission data frame carries bitmap information "1100" to indicate that two retransmission sub-frames in the retransmission data frame correspond to the third sub-frame and the fourth sub-frame in the initial transmission data frame respectively. A relative transmitting sequence of the two retransmission sub-frames may be identical to a relative transmitting sequence of respective initial transmission sub-frames.

Figure 4:
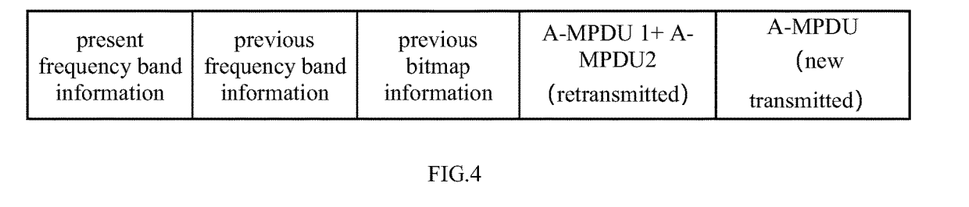
FIG. 4 is a schematic diagram illustrating yet another data frame format according to an embodiment of the present disclosure.

In the data frame shown in FIG. 4, the previous bitmap information is bitmap information in the bitmap information identifier bit, which is used to indicate the position information of the at least one initial transmission sub-frame corresponding to the at least one retransmission sub-frame included in the retransmission data frame. After receiving the data frame, the receiver may perform combination analysis on each retransmission sub-frame and the initial transmission sub-frame indicated by the previous bitmap information.

In an embodiment, the method further includes: when the retransmission data frame includes a retransmission of a sub-frame and an initial transmission sub-frame at the same time, the retransmission sub-frame is located before the initial transmission sub-frame in the retransmission data frame.

For example, the above initial transmission data frame and retransmission data frame include four sub-frames respectively. After receiving initial transmission data, the receiver may feed back reception information in the form of bitmap, for example, indicating, with "1100", that the third and fourth sub-frames in the initial transmission data frame are not correctly received. When transmitting the retransmission data frame, the bitmap information identifier bit of the retransmission data frame carries bitmap information "1100" to indicate two retransmission sub-frames are located before two initial transmission sub-frames. After receiving the retransmission data frame, the receiver may identify that a first retransmission sub-frame and a second retransmission sub-frame in the retransmission data frame correspond to the third and fourth sub-frames in the initial transmission data frame respectively.

In an embodiment, at least one of the payload format identifier bit, the retransmission identifier bit and the bitmap information identifier bit is located within a PHY header of the data frame.

In an embodiment, at least one of the payload format identifier bit, the retransmission identifier bit and the bitmap information identifier bit is located within a domain for Hybrid Automatic Repeat reQuest control in the PHY header of the data frame.

Figure 5:
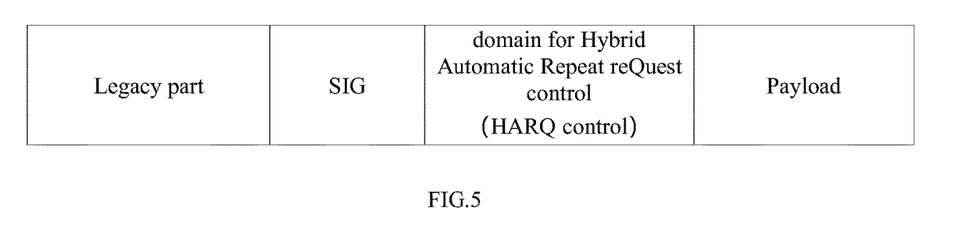
FIG. 5 is a schematic diagram illustrating still another data frame format according to an embodiment of the present disclosure.

As shown in FIG. 5, the domain for Hybrid Automatic Repeat reQuest control may be disposed in the PHY header of the data frame, and at least one of the payload format identifier bit, the retransmission identifier bit and the bitmap information identifier bit is located within the domain for Hybrid Automatic Repeat reQuest control.

In an embodiment, the retransmission data frame further includes: a frequency band information bit of the initial transmission data frame; a transmitting frequency band of the initial transmission data frame indicated by the frequency band information bit is indicated as identical to that of the retransmission data frame, or the transmitting frequency band of the initial transmission data frame indicated by the frequency band information bit is indicated as different from that of the retransmission data frame.

In a case in which an initial transmission data frame and a retransmission data frame adopt different frequency bands for transmission, and the frequency band information bit indicates a transmitting frequency band of the initial transmission data frame corresponding to the retransmission data frame, the receiver may perform combination analysis on the initial transmission data frame received from the indicated frequency band and the retransmission data frame. When the transmitting frequency bands of the retransmission data frame and the initial transmission data frame are same, the receiver may perform combination analysis on the initial transmission data frame and retransmission data frame received from the same frequency band.

In the data frame shown in FIG. 3, the previous frequency band represents frequency band information of the initial transmission data frame, and the frequency band information bit may be disposed within the domain for Hybrid Automatic Repeat reQuest (HARQ) control of the PHY header in the data frame. In this way, data which is not completely received under the same frequency band is retransmitted.

A frequency band information bit may also be disposed in each retransmission sub-frame, and the frequency band information bit indicates a transmitting frequency band of the initial transmission sub-frame corresponding to the retransmission sub-frame. The receiver may perform combination analysis on initial transmission sub-frame(s) received from the indicated frequency band and the retransmission sub-frame.

As shown in FIG. 4, each retransmission sub-frame carries the frequency band information bit of a corresponding initial transmission sub-frame. The data which is not completely received under different frequency bands may be retransmitted. The data frame may further carry frequency band information for transmitting a current data frame, which is represented by the present frequency band information in FIGS. 3 and 4.

In an embodiment, the method further includes: configuring the payload format of the data frame according to an identifier bit for identifying a format of a payload in the data frame. Herein, the payload format may be determined based on a position of the identifier bit. For example, the payload format may be determined based on a position of a softbit carried in the payload.

Figure 6:
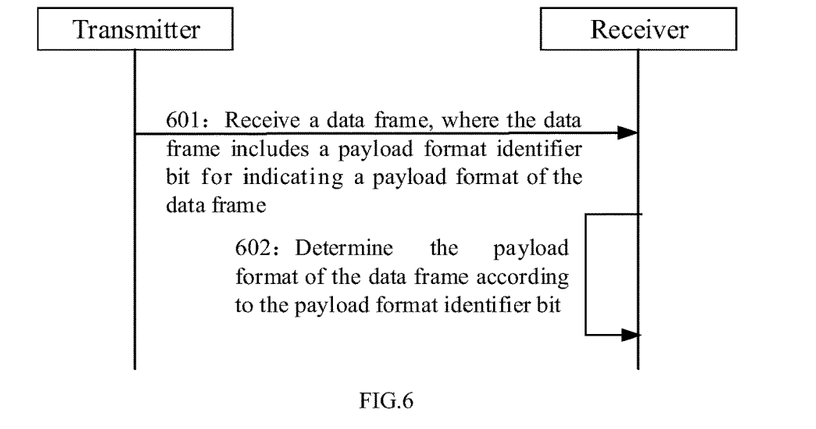
FIG. 6 is a flowchart illustrating another data transmission method according to an embodiment of the present disclosure.

As shown in FIG. 6, an exemplary embodiment of the present disclosure provides a data transmission method, which may be applied to a source base station in a data transmission process. The method includes the following steps. At step 601, a data frame is received, where the data frame includes a payload format identifier bit to indicate a payload format of the data frame. At step 602, the payload format of the data frame is determined according to the payload format identifier bit. Herein, the data frame may be a physical layer protocol data frame. The data frame may be a unicast data frame or a continuous data frame. The data frame may be applied to data transmission conforming to a transmission mechanism of HARQ.

A wireless Access Point (AP) or a wireless STAtion (STA) or the like may serve as a transmitter to transmit the data frame. A receiver such as a terminal may receive the data frame. The data frame is transmitted and received between the transmitter and the receiver based on Wi-Fi protocol.

As shown in FIG. 2, the data frame may include a Legacy part, a SIGnal (SIG) part and a Payload part. The Legacy part may include a Physical Layer Convergence Protocol (PLCP) Preamble and the like. The SIG part is used to define a data transmission rate, and the Payload part may include a Media access control Protocol Data Unit (MPDU) and the like. A payload format identifier bit may be disposed in a data frame to identify a payload format of the data frame. For example, the payload format identifier bit comprise three bits and thus may occupy three bit positions which confers a capability to indicate to a receiver, which of eight possible different payload formats is applied to the data frame.

By identifying the payload format of the data frame with the payload format identifier bit, an explicit payload format indication can be provided. The receiver may decode a payload of the data frame according to the payload format indicated by the payload format identifier bit, which improves an identification efficiency of the receiver for different formats of payloads, and further improves data transmission efficiency.

In an embodiment, the data frame further includes a retransmission identifier bit. When the retransmission identifier bit is of a first preset value, the data frame is indicated as a retransmission data frame, wherein a payload format of the retransmission data frame is different from a payload format of an initial transmission data frame corresponding to the retransmission data frame. When the retransmission identifier bit is of a second preset value, the data frame is indicated as an initial transmission data frame.

The retransmission identifier bit may be one bit occupying one bit position. In that case, the data frame may be indicated as the retransmission data frame and the initial transmission data frame by assigning one of two different values to the bit. For example, the data frame is indicated as the retransmission data frame by setting the bit to "1" and the data frame is indicated as the initial transmission data frame by setting the bit to "0".

The retransmission identifier bit may also comprise a plurality of bits occupying a plurality of bits positions, for example, occupying two bit positions. When occupying two bit positions, the retransmission identifier bit may represent four different values, i.e. "00", "01", "10" and "11". By using a plurality of format bits, the retransmission identifier bit may be used to indicate a data frame as the retransmission data frame or the initial transmission data frame, or indicate different positions for a pilot symbol, or used for incremental redundancy (IR), thus increasing a decoding success rate.

Herein, a payload of the retransmission data frame may entirely comprise retransmitted data. For example, the payload may merely include retransmitted MPDU; or may partially comprise initially-transmitted data, for example, the payload includes the retransmitted MPDU and the initially-transmitted MPDU.

If a payload of the initial transmission data frame and the payload of the retransmission data frame adopt the same format, a reception failure of the payload may easily occur. In this case, a success rate of combination analysis on the payload of the initial transmission data frame and the payload of the retransmission data frame is reduced. Thus, the payload of the retransmission data frame and the payload of the initial transmission data frame corresponding to the retransmission data frame may adopt different formats.

By adopting different formats for the payload of the retransmission data frame and the payload of the initial transmission data frame corresponding to the retransmission data frame, the reception failure of the payload can be reduced. During combination analysis, data included in the payload of the initial transmission data frame and the payload of the retransmission data frame may be supplemented mutually by using successfully-received data, thus improving the success rate of the combination analysis.

The initial transmission data frame and the retransmission data frame may also adopt different MCSs and an indication bit may be disposed in the data frame to indicate a MCS adopted by a data frame in the data frame. The MCS defines a modulation and coding scheme for the physical layer protocol data frame, and different MCSs correspond to different physical layer protocol data frame transmission rates. Different MCSs have different adaptabilities to a communication environment. Generally, an MCS with a relative low rate places a relatively low demand on communication environment.

The receiver may demodulate according to the MCS of the data frame as determined based on the indication bit. In an embodiment, when the data frame is a continuous data frame, the data frame further includes: a CDFSN of the data frame; alternatively, when the data frame is an aggregation data frame, the data frame further includes an ADSFTSN, wherein the ADSFTSN corresponds to a transmitting sequence of an aggregation data sub-frame in the data frame. When receiving the data frame has failed, the CDFSN or the ADSFTSN is returned to a transmitter. The CDFSN is a serial number of the data frame in continuous data frames. All ADSFTSNs in the data frame are in one-to-one correspondence with respective transmitting sequences of aggregation data sub-frames in the data frame.

After receiving the data frame, the receiver may transmit feedback information for reception using ACK/NACK according to the CDFSN or the ADSFTSN. In the feedback information, the CDFSN or the ADSFTSN of the data frame may be fed back in the form of bitmap. In an embodiment, a retransmission sub-frame of the retransmission data frame includes a CDFSN of an initial transmission data frame corresponding to the retransmission sub-frame or an ADSFTSN of an initial transmission sub-frame corresponding to the retransmission sub-frame. The initial transmission data frame corresponding to the retransmission sub-frame is determined according to the CDFSN or is determined according to the initial transmission sub-frame corresponding to the retransmission sub-frame is determined according to the ADSFTSN.

Herein, the retransmission data frame may be an aggregation data frame, and the retransmission sub-frame may be a sub-frame in the aggregation data frame and may also be referred to as an aggregation data sub-frame. The content of the retransmission sub-frame may be an initial transmission data frame or an initial transmission sub-frame of the aggregation data frame. In the data frame shown in FIG. 3, a retransmitted A-MPDU represents a retransmitted aggregation data sub-frame, and a previous position represents a CDFSN of an initial transmission data frame corresponding to the retransmission sub-frame, or an ADSFTSN of an initial transmission sub-frame corresponding to the retransmission sub-frame.

In FIG. 3, each retransmission sub-frame carries a previous position. After receiving the data frame, the receiver performs combination analysis on each retransmission sub-frame and the initial transmission data frame or the retransmission sub-frame corresponding to the previous position. When the content of the retransmission sub-frame includes content of an initial transmission data frame, the retransmission sub-frame may include a serial number of the initial transmission data frame in continuous data frames. In this way, when the receiver performs combination analysis, the receiver may determine the initial transmission data frame corresponding to the retransmission sub-frame based on the serial number.

When the content of the retransmission sub-frame includes content of a sub-frame of an initial transmission aggregation data frame, the retransmission sub-frame may include an ADSFTSN of the sub-frame in the aggregation data frame. When performing combination analysis, the receiver may determine an initial transmission sub-frame in the aggregation data frame corresponding to the retransmission sub-frame based on the ADSFTSN. Herein, the CDFSN or the ADSFTSN may also be in the form of bitmap.

In an embodiment, the data frame further includes a bitmap information identifier bit, wherein the bitmap information identifier bit is used to indicate position information of at least one initial transmission sub-frame corresponding to at least one retransmission sub-frame included in the retransmission data frame. The at least one initial transmission sub-frame corresponding to the at least one retransmission sub-frame is determined according to the bitmap information identifier bit.

Herein, the data frame is a retransmission data frame, the retransmission data frame may include at least one retransmission sub-frame, and the position information of an initial transmission sub-frame corresponding to the retransmission sub-frame may be represented in the form of bitmap in the bitmap information identifier bit of the retransmission data frame. After receiving the retransmission data frame, the receiver may determine at least one initial transmission sub-frame corresponding to the retransmission sub-frame based on the bitmap information identifier bit, and perform combination analysis based on the determined retransmission sub-frame and initial transmission sub-frame.

For example, an initial transmission data frame includes four sub-frames. After receiving initial transmission data, the receiver may feed back reception information in the form of bitmap, for example, indicating, with "1100", that a third sub-frame and a fourth sub-frame in the initial transmission data frame are not correctly received. When transmitting the retransmission data frame, the bitmap information identifier bit of the retransmission data frame carries bitmap information "1100" to indicate that two retransmission sub-frames in the retransmission data frame correspond to the third sub-frame and the fourth sub-frame in the initial transmission data frame respectively. A relative transmitting sequence of the two retransmission sub-frames may be identical to a relative transmitting sequence of respective initial transmission sub-frames.

In the data frame shown in FIG. 4, the previous bitmap information represents bitmap information in the bitmap information identifier bit, which is used to indicate the position information of the at least one initial transmission sub-frame corresponding to the at least one retransmission sub-frame included in the retransmission data frame. After receiving the data frame, the receiver may perform combination analysis on each retransmission sub-frame and the initial transmission sub-frame indicated by the previous bitmap information.

When the retransmission data frame includes a retransmission sub-frame and an initial transmission sub-frame at the same time, the retransmission sub-frame may be located before the initial transmission sub-frame. For example, the above initial transmission data frame and retransmission data frame include four sub-frames respectively. After receiving the initial transmission data, the receiver may feed back reception information in the form of bitmap, for example, indicating, with "1100", that the third and fourth frames in the initial transmission data frame are not correctly received. When transmitting the retransmission data frame, the bitmap information identifier bit of the retransmission data frame carries bitmap information "1100" to indicate two retransmission sub-frames are located before two initial transmission sub-frames. After receiving the retransmission data frame, the receiver may identify that a first retransmission sub-frame and a second retransmission sub-frame in the retransmission data frame correspond to the third and fourth sub-frames in the initial transmission data frame respectively.

At least one of the payload format identifier bit, the retransmission identifier bit and the bitmap information identifier bit is located within a PHY header of the data frame. At least one of the payload format identifier bit, the retransmission identifier bit and the bitmap information identifier bit is located within a domain for Hybrid Automatic Repeat reQuest control of the PHY header in the data frame. As shown in FIG. 5, the domain for Hybrid Automatic Repeat reQuest control may be disposed in the PHY header of the data frame, and at least one of the payload format identifier bit, the retransmission identifier bit or the bitmap information identifier bit is located within the domain for Hybrid Automatic Repeat reQuest control.

In an embodiment, the retransmission data frame further includes: a frequency band information bit of the initial transmission data frame; a transmitting frequency band of the initial transmission data frame indicated by the frequency band information bit is indicated as identical to that of the retransmission data frame, or, the transmitting frequency band of the initial transmission data frame indicated by the frequency band information bit is indicated as different from that of the retransmission data frame. At least one other initial transmission data frame received at the transmitting frequency band of the initial transmission data frame can be determined according to the frequency band information bit.

In a case in which an initial transmission data frame and a retransmission data frame adopt different frequency bands for transmission, and the frequency band information bit indicates a transmitting frequency band of the initial transmission data frame corresponding to the retransmission data frame, the receiver may perform combination analysis on the initial transmission data frame received from the indicated frequency band and the retransmission data frame.

In the data frame shown in FIG. 3, the previous frequency band represents frequency band information of the initial transmission data frame, and the frequency band information bit may be disposed within the domain for Hybrid Automatic Repeat reQuest control of the PHY header in the data frame. In this way, data which is not completely received under the same frequency band is retransmitted.

A frequency band information bit may also be disposed in each retransmission sub-frame, and the frequency band information bit indicates a transmitting frequency band of the initial transmission sub-frame corresponding to the retransmission sub-frame. The receiver may perform combination analysis on initial transmission sub-frame(s) received from the indicated frequency band and the retransmission sub-frame.

As shown in FIG. 4, each retransmission sub-frame carries the frequency band information bit of a corresponding initial transmission sub-frame. The data which is not completely received under different frequency bands may be retransmitted.

The data frame may further carry frequency band information for transmitting a current data frame, which is represented by the present frequency band information in FIGS. 3 and 4.

A specific example is provided below in combination with any one of the above embodiments.

When an AP or a STA receives an acknowledgement message frame indicating that a data frame is not successfully received, the AP or the STA will retransmit the data frame in the format as shown in FIG. 5.

For a unicast data frame the domain for HARQ control may be an 8-bit domain, wherein one bit is used to represent that PPDU belongs to retransmitted PPDU, and three bits are used to identify a format of a PPDU payload. Because a mechanism of Chase Combining (CC) is adopted in IEEE802.11be, the format of the payload may be determined based on a position of a soft bit in the payload. For example, three bits are used to identify eight kinds of formats, and the remaining four bits may be disposed as reservation bits.

For a continuous data frame, the domain for HARQ control may be a 16-bit domain, where one bit is used to identify that PPDU belongs to retransmitted PPDU, and three bits are used to identify the format of the PPDU payload. Because the CC mechanism is adopted in IEEE802.11be, the format of the payload may be determined based on the position of the soft bit in the payload, 6 of the remaining 12 bits are used to identify the number of data which is not correctly received and the other 6 are used to identify the number of data in the present transmission.

For a cross-frequency-band unicast data frame, HARQ may also transmit the previous frequency band information and the present frequency band information during data transmission. For a cross-frequency-band continuous data frame, during data transmission, the previous frequency band information, the present frequency band information and the previous position information may be transmitted. The following two techniques may be applied.

In technique 1, the format of data frame shown in FIG. 4 is adopted to retransmit data which is not completely received under a same frequency band, and the retransmitted data is located before continuous data. In technique 2, the format of data frame shown in FIG. 3 is adopted to retransmit data which is not completely received under different frequency bands.

Figure 7:
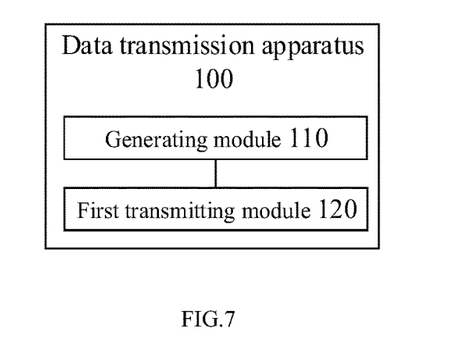
FIG. 7 is a block diagram illustrating a data transmission apparatus according to an embodiment of the present disclosure.

An embodiment of the present disclosure provides a data transmission apparatus, which comprises a transmitter operable in a wireless communication network. FIG. 7 is a schematic diagram illustrating a combination of structures comprising a data transmission apparatus 100 according to an embodiment of the present disclosure.

As shown in FIG. 7,
the apparatus 100 includes a generating module 110 and a first transmitting module 120. The generating module 110 is configured to generate a data frame, wherein the data frame includes a payload format identifier bit for indicating a payload format of the data frame. The first transmitting module 120 is configured to transmit the data frame.

In an embodiment, the data frame further includes a retransmission identifier bit indicating, when the retransmission identifier bit is of a first preset value, that the data frame is a retransmission data frame, wherein a payload format of the retransmission data frame is different from a payload format of an initial transmission data frame corresponding to the retransmission data frame. When the retransmission identifier bit is of a second preset value, the retransmission identifier bit indicates that the data frame is an initial transmission data frame.

In an embodiment, when the data frame is a continuous data frame, the data frame further includes a CDFSN of the data frame;

and when the data frame is an aggregation data frame, the data frame further includes an ADSFTSN, wherein the ADSFTSN corresponds to a transmitting sequence of an aggregation data sub-frame in the data frame.

In an embodiment, a retransmission sub-frame of the retransmission data frame includes either a CDFSN of an initial transmission data frame corresponding to the retransmission sub-frame, or an ADSFTSN of an initial transmission sub-frame corresponding to the retransmission sub-frame.

In an embodiment, the data frame further includes a bitmap information identifier bit, where the bitmap information identifier bit is used to indicate position information of at least one initial transmission sub-frame corresponding to at least one retransmission sub-frame included in the retransmission data frame.

Figure 8:
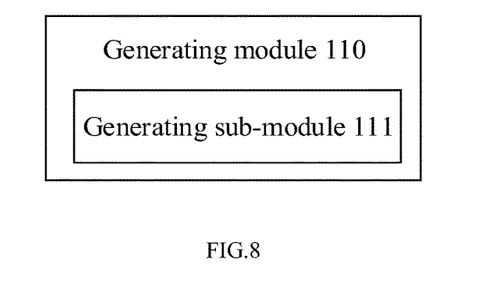
FIG. 8 is a block diagram illustrating another data transmission apparatus according to an embodiment of the present disclosure.

In an embodiment, as shown in FIG. 8, the generating module 110 further includes: a generating sub-module 111, configured to locate, when the retransmission data frame includes a retransmission sub-frame and an initial transmission sub-frame at the same time, the retransmission sub-frame before the initial transmission sub-frame.

In an embodiment, at least one of the payload format identifier bit, the retransmission identifier bit or the bitmap information identifier bit is located within a PHY header of the data frame. In an embodiment, at least one of the payload format identifier bit, the retransmission identifier bit or the bitmap information identifier bit is located within a domain for Hybrid Automatic Repeat reQuest (HARD) control of the PHY header in the data frame.

In an embodiment, the retransmission data frame further includes: a frequency band information bit of the initial transmission data frame. The frequency band information bit indicates whether or not a transmitting frequency band of the initial transmission data frame is identical to or different from the transmitting frequency band of the retransmission data frame.

Figure 9:
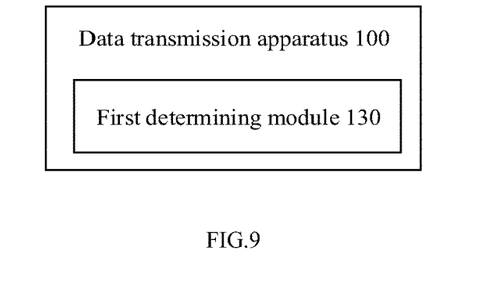
FIG. 9 is a block diagram illustrating yet another data transmission apparatus according to an embodiment of the present disclosure.

In an embodiment, as shown in FIG. 9, the apparatus 100 further includes: a first determining module 130 configured to determine the payload format of the data frame according to a correspondence between the payload format of the data frame and an identifier bit for identifying a format of a payload in the data frame.

Figure 10:
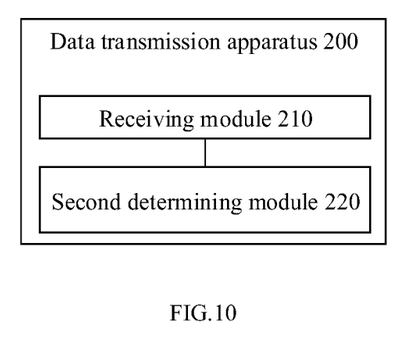
FIG. 10 is a block diagram illustrating a data transmission apparatus according to an embodiment of the present disclosure.

An embodiment of the present disclosure further provides a data transmission apparatus comprising a wireless communication receiver. FIG. 10 is a schematic diagram illustrating a combination of structures comprising a data transmission apparatus 200 according to an embodiment of the present disclosure. As shown in FIG. 10, the apparatus 200 includes a receiving module 210 and a second determining module 220. The receiving module 210 is configured to receive a data frame, wherein the data frame includes a payload format identifier bit for indicating a payload format of the data frame. The second determining module 220 is configured to determine the payload format of the data frame according to the payload format identifier bit.

In an embodiment, the data frame further includes a retransmission identifier bit, identifying, when the retransmission identifier bit is of a first preset value, that the data frame is a retransmission data frame, wherein a payload format of the retransmission data frame is different from a payload format of an initial transmission data frame corresponding to the retransmission data frame; and identifying, when the retransmission identifier bit is of a second preset value, that the data frame is an initial transmission data frame.

In an embodiment, when the data frame is a continuous data frame, the data frame further includes a CDFSN of the data frame;

and, when the data frame is an aggregation data frame, the data frame further includes an ADSFTSN, wherein the ADSFTSN corresponds to a transmitting sequence of an aggregation data sub-frame in the data frame.

Figure 11:
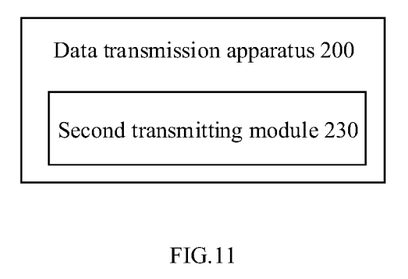
FIG. 11 is a block diagram illustrating another data transmission apparatus according to an embodiment of the present disclosure.

As shown in FIG. 11, the apparatus 200 further includes: a second transmitting module 230, configured to return, when receiving the data frame is failed, the CDFSN or the ADSFTSN to a transmitter. In an embodiment, a retransmission sub-frame of the retransmission data frame includes either a CDFSN of an initial transmission data frame corresponding to the retransmission sub-frame, or an ADSFTSN of an initial transmission sub-frame corresponding to the retransmission sub-frame.

Figure 12:
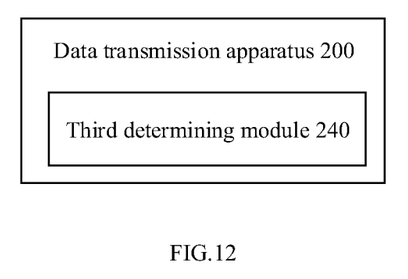
FIG. 12 is a block diagram illustrating yet another data transmission apparatus according to an embodiment of the present disclosure.

As shown in FIG. 12, the apparatus 200 further includes: a third determining module 240 configured to determine either the initial transmission data frame corresponding to the retransmission sub-frame according to the CDFSN, or the initial transmission sub-frame corresponding to the retransmission sub-frame according to the ADSFTSN.

In an embodiment, the data frame further includes a bitmap information identifier bit, wherein the bitmap information identifier bit is used to indicate position information of at least one initial transmission sub-frame corresponding to at least one retransmission sub-frame included in the retransmission data frame.

Figure 13:
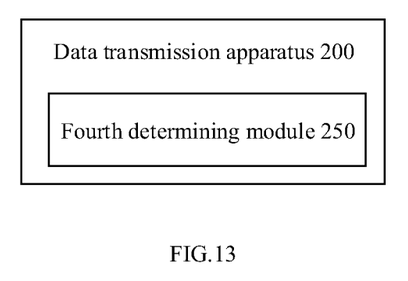
FIG. 13 is a block diagram illustrating still another data transmission apparatus according to an embodiment of the present disclosure.

As shown in FIG. 13, the apparatus 200 further includes: a fourth determining module 250 configured to determine the at least one initial transmission sub-frame corresponding to the at least one retransmission sub-frame according to the bitmap information identifier bit. In an embodiment, the retransmission data frame further includes a frequency band information bit of the initial transmission data frame. The frequency band information bit indicates whether a transmitting frequency band of the initial transmission data frame is identical to or different from a transmitting frequency band of the retransmission data frame.

Figure 14:
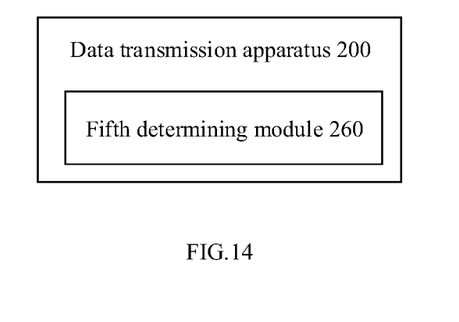
FIG. 14 is a block diagram illustrating still another data transmission apparatus according to an embodiment of the present disclosure.

As shown in FIG. 14, the apparatus 200 further includes: a fifth determining module 260 configured to determine other initial transmission data frame received at the transmitting frequency band of the initial transmission data frame according to the frequency band information bit. In an exemplary embodiment the generating module 110, the first transmitting module 120, the first determining module 130, the receiving module 210, the second determining module 220, the second transmitting module 230, the third determining module 240, the fourth determining module 250 and the fifth determining module 320 and the like may be implemented by one or more of Central Processing Unit (CPU), Graphics Processing Unit (GPU), baseband processor (BP), Application Specific Integrated Circuit (ASIC), DSP, Programmable Logic Device (PLD), Complex Programmable Logic Device (CPLD), Field-Programmable Gate Array (FPGA), general processor, controller, Micro Controller Unit (MCU), Microprocessor, or other electronic elements or may be implemented by combining one or more radio frequency (RF) antennas, so as to perform the above methods.

Figure 15:
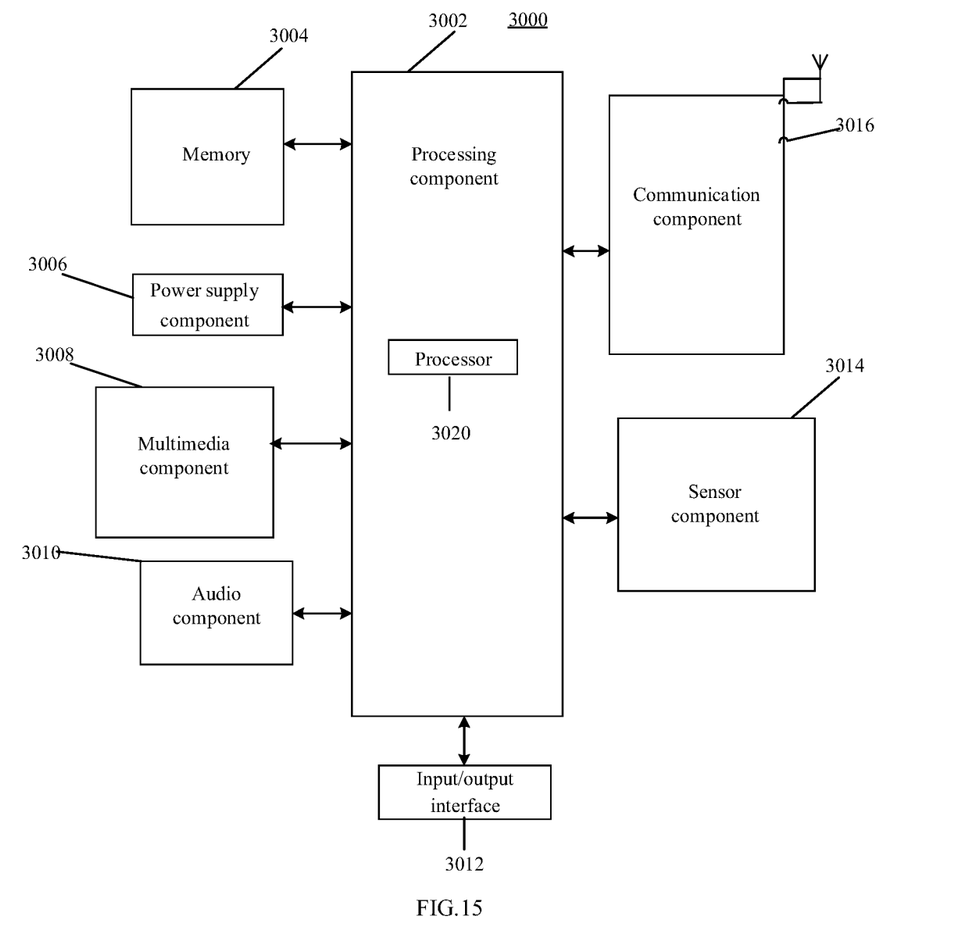
FIG. 15 is a block diagram illustrating an apparatus for transmitting data according to an embodiment of the present disclosure.

FIG. 15 is a block diagram illustrating an apparatus 3000 for data transmission according to an embodiment of the present disclosure. For example, the apparatus 3000 may be a mobile phone, a computer, a digital broadcast terminal, a message transceiving device, a game console, a tablet device, a medical device, a fitness device and a personal digital assistant and the like.

As shown in FIG. 15, the apparatus 3000 may include one or more of the following components: a processing component 3002, a memory 3004, a power supply component 3006, a multimedia component 3008, an audio component 3010, an input/output (I/O) interface 3012, a sensor component 3014 and a communication component 3016.

The processing component 3002 generally controls overall operations of the apparatus 3000, such as operations associated with display, phone calls, data communications, camera operations, and recording operations. The processing component 3002 may include one or more processors 3020 to execute instructions to complete all or part of the steps of the above methods. In addition, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of instructions and/or data to support the operation of the apparatus 3000. Examples of such instructions and/or data include instructions for any application or method operated on the apparatus 3000, contact data, phonebook data, messages, pictures, videos, and so on. The memory 3004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 3006 supplies power for different components of the apparatus 3000. The power supply component 3006 may include a power supply management system, one or more power supplies, and other components associated with generating, managing and distributing power for the apparatus 3000.

The multimedia component 3008 includes a screen that provides an output interface between the apparatus 3000 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some embodiments, the multimedia component 3008 includes a front camera and/or a rear camera. When the apparatus 3000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some embodiments, the audio component 3010 also includes a loudspeaker for outputting an audio signal.

The I/O interface 3012 provides an interface between the processing component 3002 and a peripheral interface module which may be a keyboard, a click wheel, a button, or the like. These buttons may include, but are not limited to a home button, a volume button, a start button, and a lock button.

The sensor component 3014 includes one or more sensors for providing a status assessment in various aspects to the apparatus 3000. For example, the sensor component 3014 may detect an open/closed state of the apparatus 3000, and the relative positioning of components, for example, the component is a display and a keypad of the apparatus 3000. The sensor component 3014 may also detect a change in position of the apparatus 3000 or a component of the apparatus 3000, the presence or absence of a user in contact with the apparatus 3000, the orientation or acceleration/deceleration of the apparatus 3000 and a change in temperature of the apparatus 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an acceleration sensor, a gyro sensor, a magnetic sensor, a pressure sensor, or a temperature sensor.

The communication component 3016 is configured to facilitate wired or wireless communication between the apparatus 3000 and other devices. The apparatus 3000 may access a wireless network based on a communication standard, such as WiFi, 2G or 3G, or a combination thereof. In an embodiment, the communication component 3016 receives broadcast signals or broadcast associated information from an external broadcast management system via a broadcast channel. In an embodiment, the communication component 3016 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the apparatus 3000 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

In an embodiment, there is also provided a non-transitory computer readable storage medium including computer program instructions, such as a memory 3004, wherein the instructions are executable by the processor 3020 of the apparatus 3000 to perform the method as described above. For example, the non-transitory computer readable storage medium may be ROM, RAM, CD-ROM, magnetic tape, floppy disk, and optical data storage device and the like.

Other implementations of the present disclosure will be apparent to those skilled in the art from consideration of the specification and practical examples of the present disclosure described herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the particular structures described above and shown in the accompanying drawings, and that various modifications and changes may be made without departing from the scope thereof. The scope of the present disclosure is limited only by the appended claims.

The invention claimed is:

1. A data transmission method, comprising:
generating a data frame, wherein the data frame comprises a payload format identifier bit for indicating a modulation and coding scheme (MCS) applied to a payload of the data frame and a retransmission identifier bit for indicating whether the data frame is a retransmission data frame, the payload of the data frame comprises a media access control protocol data unit (MPDU) or an aggregation MPDU (A-MPDU), and the retransmission identifier bit is located within a header of the data frame; and
transmitting the data frame.

2. The method of claim 1, wherein:
when the retransmission identifier bit is of a first preset value, the retransmission identifier bit indicates that the data frame is the retransmission data frame, wherein a payload format of the retransmission data frame is different from that of an initial transmission data frame corresponding to the retransmission data frame; and
when the retransmission identifier bit is of a second preset value, the retransmission identifier bit indicates that the data frame is an initial transmission data frame.

3. The method of claim 1, wherein:
when the data frame is a continuous data frame, the data frame further comprises a continuous data frame serial number (CDFSN) of the data frame; or
when the data frame is an aggregation data frame, the data frame further comprises an aggregation data sub-frame transmitting serial number (ADSFTSN), wherein the ADSFTSN corresponds to a transmitting sequence of an aggregation data sub-frame in the data frame.

4. The method of claim 2, wherein a retransmission sub-frame of the retransmission data frame comprises a CDFSN of an initial transmission data frame corresponding to the retransmission sub-frame or an ADSFTSN of an initial transmission sub-frame corresponding to the retransmission sub-frame.

5. The method of claim 2, wherein the data frame further comprises a bitmap information identifier bit, and wherein the bitmap information identifier bit is used to indicate position information of at least one initial transmission sub-frame corresponding to at least one retransmission sub-frame comprised in the retransmission data frame.

6. The method of claim 2, further comprising: locating, when the retransmission data frame comprises a retransmission sub-frame and an initial transmission sub-frame at the same time, the retransmission sub-frame before the initial transmission sub-frame.

7. The method of claim 5, wherein at least one of the payload format identifier bit, or the bitmap information identifier bit is located within the header of the data frame.

8. The method of claim 7, wherein at least one of the payload format identifier bit, the retransmission identifier bit or the bitmap information identifier bit is located within a domain for hybrid automatic repeat request (HARQ) control of the header of the data frame.

9. The method of claim 2, wherein the retransmission data frame further comprises a frequency band information bit of the initial transmission data frame; and the frequency band information bit indicates a transmitting frequency band of the initial transmission data frame which is identical to or different from a transmitting frequency band of the retransmission data frame.

10. The method of claim 1, further comprising: configuring a payload format of the data frame according to an identifier bit for identifying a format of a payload in the data frame.

11. A data transmission method, comprising:
receiving a data frame, wherein the data frame comprises a payload format identifier bit for indicating a modulation and coding scheme (MCS) applied to a payload of the data frame and a retransmission identifier bit for indicating whether the data frame is a retransmission data frame, the payload of the data frame comprises a media access control protocol data unit (MPDU) or an aggregation MPDU (A-MPDU), and the retransmission identifier bit is located within a header of the data frame; and
determining a payload format of the data frame according to the payload format identifier bit.

12. The method of claim 11, wherein the method further comprises:
identifying, when the retransmission identifier bit is of a first preset value, that the data frame is the retransmission data frame, wherein a payload format of the retransmission data frame is different from that of an initial transmission data frame corresponding to the retransmission data frame; and
identifying, when the retransmission identifier bit is of a second preset value, that the data frame is an initial transmission data frame.

13. The method of claim 11, wherein:
when the data frame is a continuous data frame, the data frame further comprises a continuous data frame serial number (CDFSN) of the data frame; or
when the data frame is an aggregation data frame, the data frame further comprises an aggregation data sub-frame transmitting Serial Number (ADSFTSN), wherein the ADSFTSN corresponds to a transmitting sequence of an aggregation data sub-frame in the data frame; and
wherein the method further comprises: returning, when receiving the data frame has failed, the CDFSN or the ADSFTSN to a transmitter.

14. The method of claim 12, wherein a retransmission sub-frame of the retransmission data frame comprises: a CDFSN of an initial transmission data frame corresponding to the retransmission sub-frame, or an ADSFTSN of an initial transmission sub-frame corresponding to the retransmission sub-frame; and wherein the method further comprises:
determining the initial transmission data frame corresponding to the retransmission sub-frame according to the CDFSN; or
determining the initial transmission sub-frame corresponding to the retransmission sub-frame according to the ADSFTSN.

15. The method of claim 12, wherein the data frame further comprises a bitmap information identifier bit, wherein the bitmap information identifier bit is used to indicate position information of at least one initial transmission sub-frame corresponding to at least one retransmission sub-frame comprised in the retransmission data frame; and wherein the method further comprises: determining the at least one initial transmission sub-frame corresponding to the at least one retransmission sub-frame according to the bitmap information identifier bit.

16. The method of claim 12, wherein the retransmission data frame further comprises a frequency band information bit of the initial transmission data frame; the frequency band information bit indicates a transmitting frequency band of the initial transmission data frame which is identical to or different from a transmitting frequency band of the retransmission data frame; and wherein the method further comprises: determining other initial transmission data frame received at the transmitting frequency band of the initial transmission data frame according to the frequency band information bit.

17. A data transmission apparatus comprising:
one or more processors, and
a non-transitory computer-readable storage medium for storing instructions executable by the one or more processors,
wherein the one or more processors are configured to implement the method of:
generating a data frame, wherein the data frame comprises a payload format identifier bit for indicating a modulation and coding scheme (MCS) applied to a payload of the data frame and a retransmission identifier bit for indicating whether the data frame is a retransmission data frame, the payload of the data frame comprises a media access control protocol data unit (MPDU) or an aggregation MPDU (A-MPDU), and the retransmission identifier bit is located within a header of the data frame; and
transmitting the data frame.

18. The apparatus of claim 17, wherein:
when the retransmission identifier bit is of a first preset value, the retransmission identifier bit indicates that the data frame is the retransmission data frame, wherein a payload format of the retransmission data frame is different from that of an initial transmission data frame corresponding to the retransmission data frame; and
when the retransmission identifier bit is of a second preset value, the retransmission identifier bit indicates that the data frame is an initial transmission data frame.

19. The apparatus of claim 17, wherein when the data frame is a continuous data frame, the data frame further comprises a continuous data frame serial number (CDFSN) of the data frame; or when the data frame is an aggregation data frame, the data frame further comprises an aggregation data sub-frame transmitting serial number (ADSFTSN), wherein the ADSFTSN corresponds to a transmitting sequence of an aggregation data sub-frame in the data frame.

20. A data transmission apparatus, comprising:
one or more processors, and
a non-transitory computer-readable storage medium for storing instructions executable by the one or more processors,
wherein the one or more processors are configured to implement the method according to claim 11.

* * * * *

UNITED STATES PATENT AND TRADEMARK OFFICE
CERTIFICATE OF CORRECTION

PATENT NO. : 12,224,864 B2  
APPLICATION NO. : 17/582491  
DATED : February 11, 2025  
INVENTOR(S) : Xiandong Dong Page 1 of 1

It is certified that error appears in the above-identified patent and that said Letters Patent is hereby corrected as shown below:

In the Specification

In Column 1, Line 23, delete "Acknowledge" and insert -- Acknowledgement --, therefor.
In Column 1, Line 28, delete "Repeat-Request" and insert -- Repeat Request --, therefor.
In Column 2, Line 16, delete "(HARD)" and insert -- (HARQ) --, therefor.
In Column 3, Line 66, delete "(HARD)" and insert -- (HARQ) --, therefor.
In Column 8, Line 50, delete "relative" and insert -- relatively --, therefor.
In Column 9, Line 15, delete "may be may be" and insert -- may be --, therefor.
In Column 13, Line 16, delete "relative" and insert -- relatively --, therefor.
In Column 16, Lines 52-57, delete "the apparatus . . . . . frame." and insert the same at Line 51, after "FIG. 7,", as a continuation paragraph.
In Column 17, Lines 4-7, delete "and when . . . . . frame." and insert the same at Line 3, after "frame;", as a continuation paragraph.
In Column 17, Line 33, delete "(HARD)" and insert -- (HARQ) --, therefor.
In Column 18, Lines 7-10, delete "and, when . . . . . frame." and insert the same at Line 6, after "frame;", as a continuation paragraph.
In Column 20, Line 42, delete "ultrawideband" and insert -- ultra-wideband --, therefor.

Signed and Sealed this  
Twenty-ninth Day of April, 2025

Coke Morgan Stewart  
*Acting Director of the United States Patent and Trademark Office*